United States Patent [19]
Hemmer et al.

[11] Patent Number: 5,377,210
[45] Date of Patent: Dec. 27, 1994

[54] SELF-PUMPED OPTICAL PHASE CONJUGATION WITH A SODIUM RAMAN LASER

[75] Inventors: Philip R. Hemmer, Fitchburg; Jonathan S. Kane, Wayland; John J. Donoghue, South Boston, all of Mass.

[73] Assignee: The United States of America as represented by the Secretary of the Air Force, Washington, D.C.

[21] Appl. No.: 881,013

[22] Filed: May 8, 1992

[51] Int. Cl.⁵ ............................................. H01S 3/30
[52] U.S. Cl. ............................................. 372/3; 372/9; 372/69; 372/99
[58] Field of Search ................... 372/92, 99, 9, 3, 69

[56] References Cited
U.S. PATENT DOCUMENTS

| | | | |
|---|---|---|---|
| 4,327,337 | 4/1982 | Liu | 372/3 |
| 4,742,522 | 5/1988 | Linford | 372/2 |
| 4,791,644 | 12/1988 | Dubé | 372/3 |
| 5,072,135 | 12/1991 | Huignard et al. | 372/3 |
| 5,090,016 | 2/1992 | DeWhirst et al. | 372/3 |

OTHER PUBLICATIONS

Gaeta et al, "Continuous Wave Self-Pumped Optical Phase Conjugation in Atomic Sodium Vapor", Optics Lett. vol. 24 (4) 15 Feb. 1989.
Gaeta, C. J. et al, "Continuous-wave self-pumped optical phase conjugation in atomic sodium vapor", Feb. 15, 1989, vol. 14, No. 4, Optical Letters, pp. 245-247.
Kumar, Prem et al, "Observation of Raman-shifted oscillation near the sodium D lines", Optics Letters, vol. 10, No. 5, May 1985, pp. 226-228.

Primary Examiner—Rodney B. Bovernick
Assistant Examiner—Hemang Sanghavi
Attorney, Agent, or Firm—Donald J. Singer; Robert L. Nathans

[57] ABSTRACT

A three-level atomic system in a resonance Raman configuration is provided, and self-pumped optical phase conjugation is performed in which the pumps are self-induced as standing waves in a Raman laser. Self-pumped reflectivities approaching five percent are obtained for input intensities of 20 watts per square cm. This low optical input intensity combined with predicted submicrosecond response times indicates that the resonant Raman interaction may provide the basis for a promising new class of non-linear optical materials.

20 Claims, 3 Drawing Sheets

SELF-PUMPED OPTICAL PHASE CONJUGATION WITH A SODIUM RAMAN LASER

STATEMENT OF GOVERNMENT INTEREST

The invention described herein may be manufactured and used by or for the Government for governmental purposes without the payment of any royalty thereon.

BACKGROUND OF THE INVENTION

While wave-front conjugation systems employing photorefractive nonlinear devices can be operated in the laboratory, vibration encountered in real world environments washes out the holograms in the photorefractive devices because the response time of these devices is too slow.

It would be highly desirable to develop optical wavefront conjugation systems having high operating speeds and efficiencies at low optical power levels.

Recently there has been increased interest in the use of resonant atomic systems for performing optical wave-front conjugation. See P. F. Lino et al., Appl. Phys. Lett. 32, 813 (1978). This is because resonant atomic systems are inherently fast. However, resonant systems tend to have lower efficiency and greater optical power requirements than photorefractive crystals such as $BaTiO_3$.

BRIEF SUMMARY OF AN EMBODIMENT OF THE INVENTION

In accordance with the invention, a three-level atomic system in a resonance Raman configuration is provided having higher operating speeds relative to approaches employing photorefractive devices. Furthermore, the required laser intensity is nearly two orders of magnitude lower than intensities required in techniques employing resonance in two level systems. Thus, our system is expected to have substantial advantages over conventional two-level atomic systems.

BRIEF DESCRIPTION OF THE DRAWINGS

Other objects, features and advantages of the present invention will become apparent upon study of the following description, taken in conjunction with the drawings in which.

Figure two illustrates beam traces useful in the understanding of the conjugator of FIG. 1.

DETAILED DESCRIPTION OF EMBODIMENTS OF THE INVENTION

To demonstrate the feasibility of resonance Raman systems for nonlinear optics applications, we have performed self-pumped optical phase conjugation, with pumps self-induced in a sodium-vapor Raman laser.

The sodium Raman laser was first demonstrated by Kumar and Shapiro with a ring laser geometry. In this demonstration, Raman-shifted unidirectional lasing was observed at pump powers of less than 40 $W/cm^2$. We adapted this Raman ring laser to a standing-wave configuration similar to that used by Gaeta et al. in their initial demonstration of self-pumped phase conjugation using two-level interactions in sodium vapor. See C. J. Gaeta et al., Opt. Lett. 14, 245 (1989).

Figure 1:
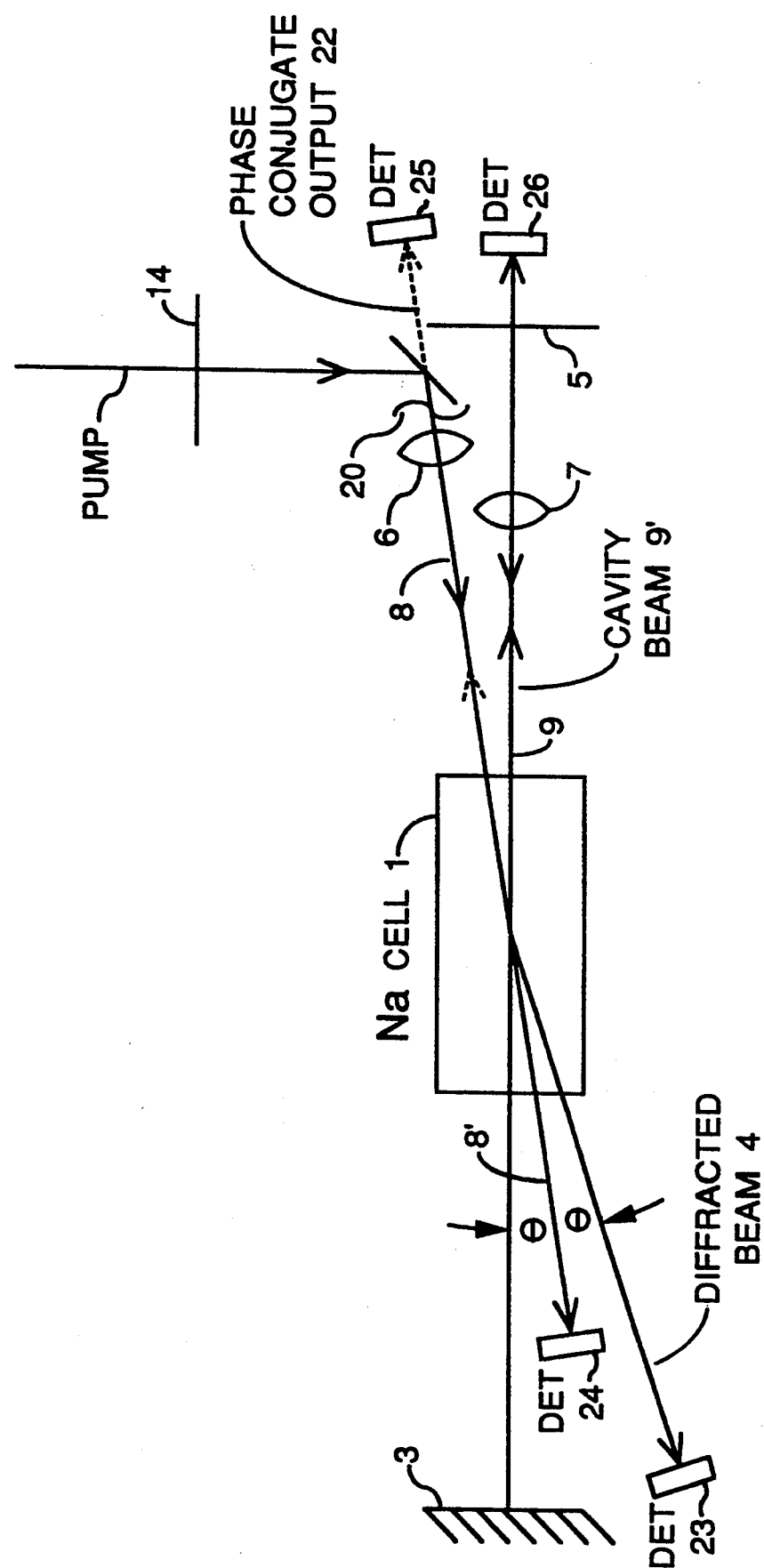
FIG. 1 illustrates a presently preferred embodiment of the invention utilized as a phase conjugator.

A schematic of our experiment is shown in FIG. 1. The near resonant Raman nonlinear optical device comprises sodium cell 1 which is a heat-pipe oven of 13-cm active length, with a 6.4 mm diameter optical aperture. The self-pumped standing wave Raman laser cavity bounded by light reflectors 3 and 5, had a length of 2.6 m with a 2-m focal-length lens 7 inserted to make the resonator stable. Both lenses and cell windows are multilayer anti-reflection coated to reduce cavity losses. The measured cavity loss is 6% per round trip including the loss from the 98% Raman laser coupling mirror 5 shown in the figure. A 40 cm lens 6 is also placed in the pump-beam path 8 to image object 14 in cell 1, modulating the input beam, within cell 1 as will be described. The pump laser beam 8' has a 1-mm FWHM spot size at the sodium cell, and its angle of incidence relative to the cavity optic axis 9 is typically 0.2 degrees. Standard operating conditions are 10 Torr of He buffer gas pressure and a high enough temperature to obtain approximately 50% absorption at resonance for the input pump power of 240 mW. The exact temperature inside the heat-pipe cell 1 depends upon its position. In our experiments the temperature on the outer surface of the cell was 360 degrees Celsius near the cell midpoint. Hence, the input beam 8 can be impressed with an intelligence bearing signal such as object 14 and can thereafter pass through an aberrating media 20 which aberrates the signal. Media 20 could be an optical element introducing optical distortion within the beam or the turbulent atmosphere of the earth. However, the non-distorted phase conjugate output beam 22 will carry the non-aberrated image of object 14. The intelligence bearing signal could also be a binary alpha-numeric pulse train.

Figure 2:
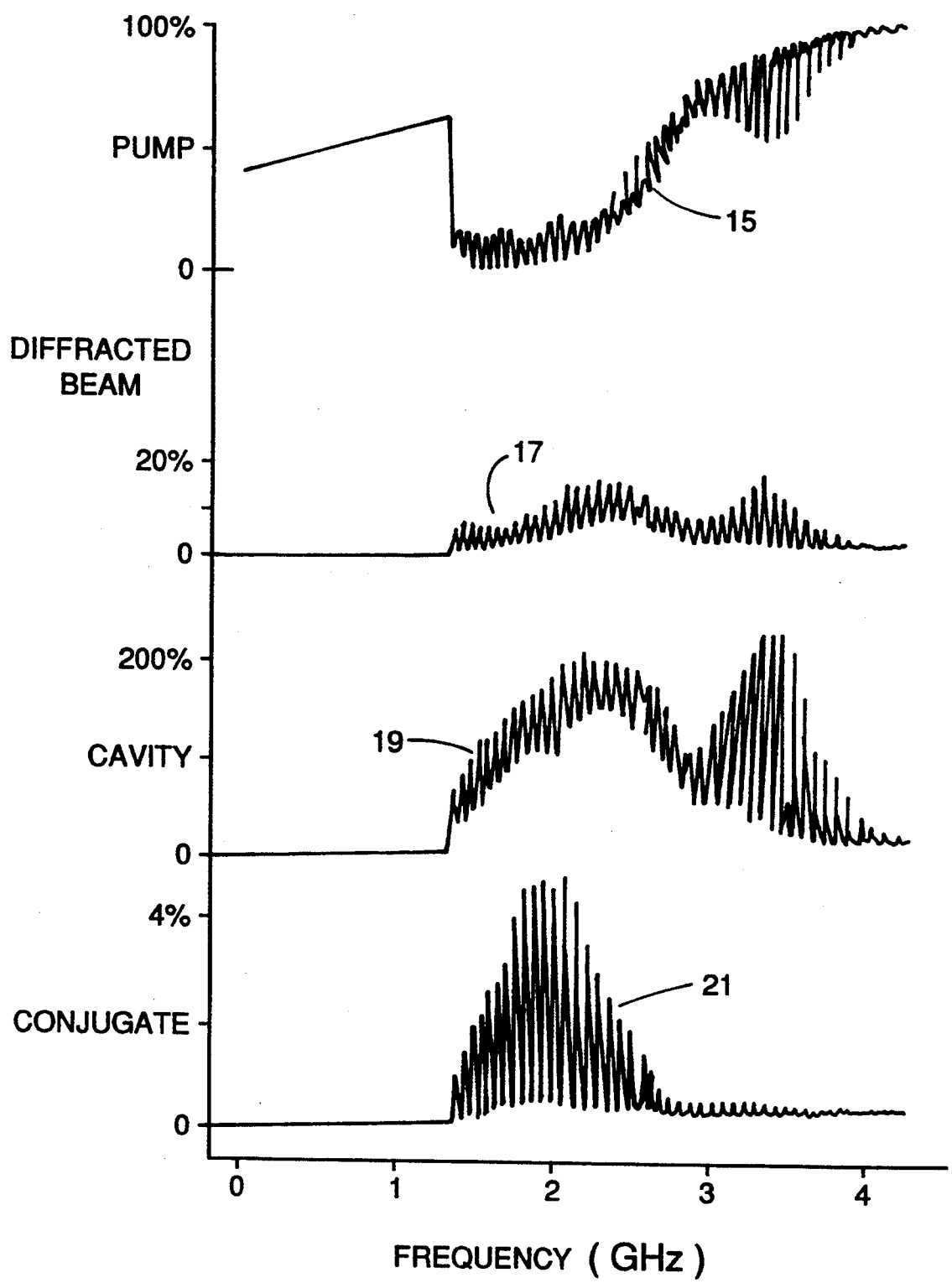

To evaluate system performance, we simultaneously monitored four beams by means of four detectors 23-26 as shown in FIG. 1. The measured optical power in these four beams as a function of pump laser detuning to the blue of the sodium $D_1$ line is shown in FIG. 2. From top to bottom, the data traces in this figure are of the transmitted pump beam, 8', trace 15, the diffracted beam 4, trace 17, the Raman laser cavity beam 9', trace 19, and the phase-conjugate output beam 22, trace 21. Optical powers in all four beams are expressed as a percentage of the input pump power of 240 mW.

Examination of FIG. 2 shows that a peak conjugate reflectivity of nearly 5% occurs at approximately 2 GHz from resonance. For these data, resonance is defined as the laser frequency at which minimum absorption is obtained in a Droppler-broadened reference cell. Again, these data were obtained for an input pump power of 240 mW, which translates to a peak intensity of approximately 20 $W/cm^2$, assuming a Gaussian laser beam of 1-mm FWHM spot size. Of course, the exact intensity inside the sodium cell is not known owing to the competing effects of resonant absorption and mild self-focusing.

Further examination of FIG. 2 shows a matching comblike structure in optical power versus laser frequency in both the conjugate and Raman laser beams. This comblike structure, was first observed by Kumar and Shapiro (Opt. Lett. 10, 226 (1985)) and is attributed to the fact that the Raman gain curve is more narrow band than the cavity free spectral range of 52 MHz. When the cavity output is beat against the pump beam, a single 3-MHz-wide beat note is observed near 1772 MHz. This single narrow beat note at the Raman frequency is the characteristic signature of a Raman laser in sodium. The conjugate beam in our experiment was found to be doubly Raman shifted from the pump frequency in the same sense as the Raman laser beam (farther from resonance).

Finally, for a linearly polarized pump beam, the Raman laser beam polarization was predominantly linear but perpendicular to the pump, whereas the conjugate polarization was linear and parallel to the pump. This is expected for a Raman interaction in sodium owing to the selection rules for the dipole transitions.

The circulating optical power in the Raman resonator, indicated by trace 19 of FIG. 2, is as much as twice the input pump power. Since the measured spot size of the Raman laser output beam is the same as that of the input pump (1 mm FWHM), the intensity of the intracavity oscillation is actually twice that of the input pump. This illustrates the high efficiency of the Raman interaction at these low pump intensities. Also of interest, is the transmitted pump-beam power, indicated by trace 15 of FIG. 2. In the absence of lasing, the resonance pump absorption is approximately 55%. However, when lasing and phase conjugation commence, the pump absorption abruptly increases to nearly 100%. This indicates that the Raman laser transfers energy out of the pump at least as efficiently as resonant absorption. Finally, the optical power in the diffracted beam 4 of FIG. 1 is shown in trace 17 of FIG. 2. As can be seen, this diffracted beam contains as much as 20% of the input pump power and therefore acts as a loss for the phase-conjugate process. This diffracted beam has been observed only in the forward direction. Its frequency is Raman shifted in the opposite sense to that of the Raman laser and is therefore consistent with first-order Bragg diffraction from a moving grating. Its intensity-versus-frequency characteristics most closely resemble those of the Raman laser.

Figure 3:
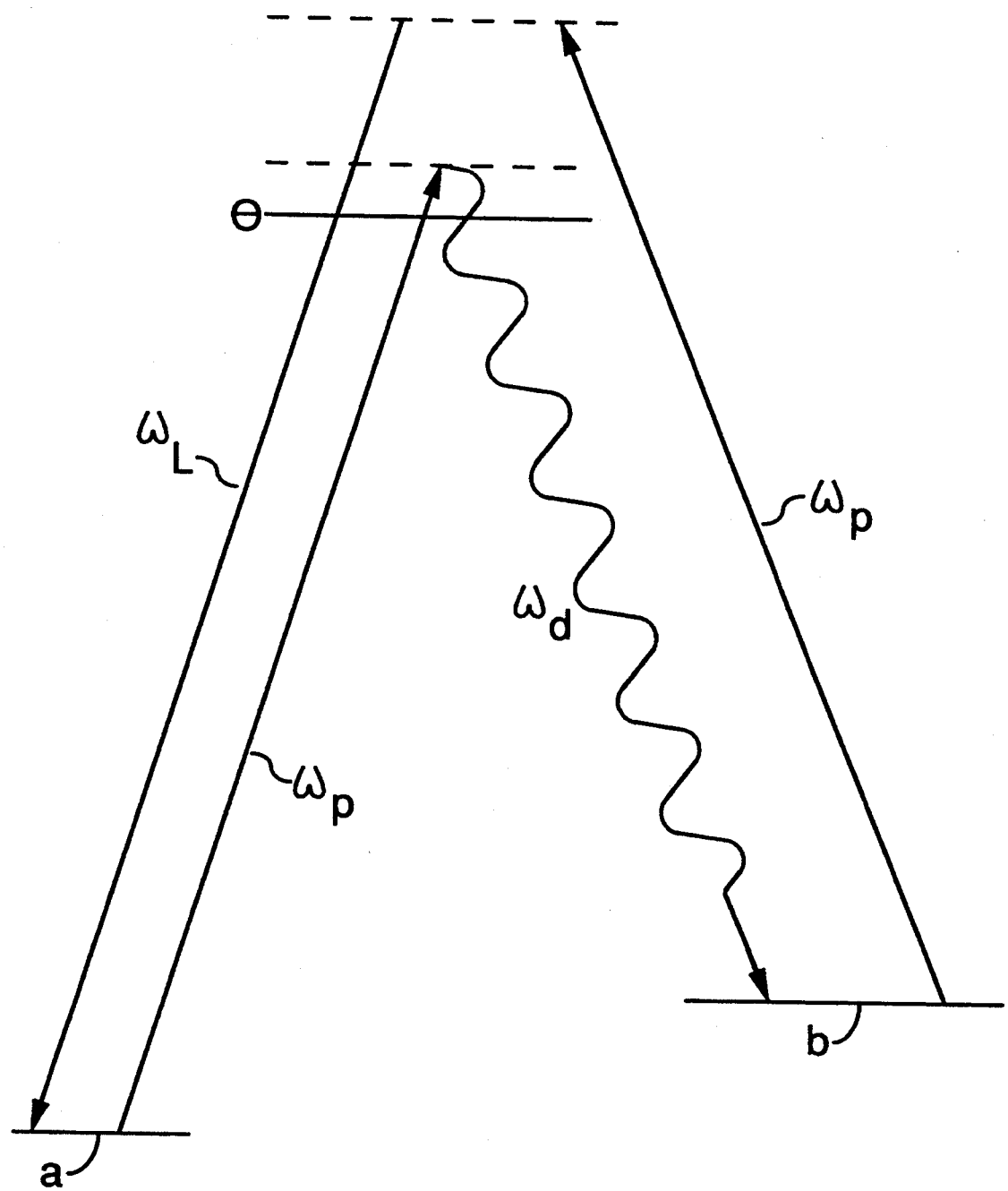
FIG. 3 illustrates the prior art mechanism for the Raman laser.

The mechanism responsible for the Raman laser, as proposed by Kumar and Shapiro ibid., is illustrated in FIG. 3. In this figure the pump beam interacts simultaneously with both ground states of the three-level system and generates two additional laser fields at the frequencies indicated. One of these is Raman shifted farther from resonance than the pump and produces the Raman laser output. The other is Raman shifted closer to resonance and has the same frequency as the diffracted beam. FIG. 3 suggests that the Raman gain process is the result of a nondegenerate four wave mixing process wherein the pump beam provides two of the waves. This has yet to be shown theoretically. If the above mechanism is correct, the phase-conjugate output would be viewed as the result of a nondegenerate six-wave mixing process (not shown) wherein the pump and Raman laser beams provide four of the six fields.

One of the major advantages of being able to perform self-pumped optical phase conjugation with an unfocused pump beam is the ability to conjugate images easily. Self-pumped image conjugation at these low optical intensities has been previously demonstrated only in photorefractives. To demonstrate self-pumped image conjugation in our system, we imaged a positive U.S. Air Force resolution chart, object 14 in FIG. 1, into the sodium cell 1. This was accomplished using a 40-cm focal-length lens 6 and a 4f object to image distance. A positive rather than a negative resolution chart was used to keep the total input laser power above the 100-mW threshold needed for the production of a conjugate beam. A conjugate image was produced by this system with a resolution of about eight lines/mm. Mild aberrators were also inserted in the pump-beam path after the input image. The resulting conjugate output image was free of aberrations, but the intensity envelope was no longer a smooth Gaussian. Here it must be emphasized that the image data is only preliminary. The experimental setup was not specifically designed to process images. In fact, some of the higher diffraction orders actually missed the input mirror. Nonetheless it is significant that an image can be conjugated at all with a self-pumped geometry in a strongly absorbing medium at such low intensities.

In summary, we have achieved a phase-conjugate reflectivity of nearly 5% using a self-pumped Raman laser in sodium vapor. This relatively high reflectivity was accomplished with only 20 $W/cm^2$ of input pump intensity. This represents a factor-of-50 reduction in pump intensity for comparable reflectivity in previous sodium vapor experiments; C. J. Gaeta et al., ibid. Moreover, the low-intensity threshold allowed us to conjugate images easily. Thus we have demonstrated the potential of the resonant Raman system as the basis for a new class of high speed nonlinear-optical material. In addition, we expect similar reductions in laser power requirements for non-self-pumped geometries wherein the pump beams are generated by an acousto-optic or electro-optic modulator. Finally, the resonant Raman processes in Li, Rb, or Cs vapors can be excited with semiconductor lasers for which the low laser power requirements are especially important. In fact, non-self-pumped schemes would be much simpler for semiconductor laser excitation because the Raman-shifted frequencies needed could be easily produced by high-speed modulation of the lasers.

Thus it should be appreciated that the invention is not to be restricted to optical phase conjugators which is a special case of four-wave mixing. As will be appreciated by those skilled in the art, the invention is also applicable to two-wave mixing for carrying out applications such as beam steering, optical amplification, and other image processing such as generating various filter functions at the Fourier plane, that can be carried out with current nonlinear optical devices.

Thus the scope of the invention is not to be restricted to phase conjugators, and is to be restricted only by the terms of the following claims and art recognized equivalents thereof. For example, an atomic beam, a doped crystal, or MQW semiconductor can be utilized as the nonlinear resonant Raman optical element.

We claim:

1. Method of producing an optical phase conjugate beam from an input near resonance signal beam comprising the steps of:
    (a) providing a resonant Raman gain medium having two atomic ground states;
    (b) causing two counter-propagating coherent pump beams, frequency shifted from the input near resonance signal beam by a Raman transition frequency, to interact simultaneously with the input near resonance signal beam and both atomic ground states of said resonant Raman gain medium;
    (c) producing near-thresholdless Raman gain of a conjugate output beam, Raman shifted by a single frequency from the pump beams, and double Raman shifted from the input near resonance signal beam.

2. The method of claim 1 wherein said pump beam is modulated with an optical image and further including subjecting said pump beam to wavefront before introducing said pump beam into said Raman gain medium.

3. The method of claim 2 wherein said Raman gain medium is a Raman laser.

4. The method of claim 3 wherein said Raman gain medium is a sodium vapor Raman laser.

5. The method of claim 3 wherein said Raman gain medium self-pumped.

6. The method of claim 3 wherein said resonant Raman gain medium comprises an atomic system having at least three levels.

7. The method of claim 2 wherein said Raman gain medium self-pumped.

8. The method of claim 7 wherein said pump beam is unfocused.

9. The method of claim 2 wherein said resonant Raman gain medium comprises an atomic system having at least three levels.

10. The method of claim 9 wherein said pump beam is unfocused.

11. The method of claim 2 wherein said pump beam is unfocused.

12. The method of claim 1 wherein said Raman gain medium is a Raman laser.

13. The method of claim 12 wherein said Raman gain medium is a sodium vapor Raman laser.

14. The method of claim 12 wherein said Raman gain medium is self-pumped.

15. The method of claim 12 wherein said resonant Raman gain medium comprises an atomic system having at least three levels.

16. The method of claim 15 wherein said pump beam is unfocused.

17. The method of claim 3 wherein said Raman gain medium is self-pumped.

18. The method of claim 17 wherein said pump beam is unfocused.

19. The method of claim 1 wherein said resonant Raman gain medium comprises an atomic system having at least three levels.

20. The method of claim 1 wherein said pump beam is unfocused.

* * * * *